United States Patent
Kiyosawa (10) Patent No.: US 12,281,699 B2
(45) Date of Patent: Apr. 22, 2025

(54) LUBRICATION METHOD FOR GEAR DEVICE

(71) Applicant: HARMONIC DRIVE SYSTEMS INC., Tokyo (JP)

(72) Inventor: Yoshihide Kiyosawa, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/560,761

(22) PCT Filed: Jul. 20, 2021

(86) PCT No.: PCT/JP2021/027068
§ 371 (c)(1),
(2) Date: Nov. 14, 2023

(87) PCT Pub. No.: WO2023/002552
PCT Pub. Date: Jan. 26, 2023

(65) Prior Publication Data
US 2024/0255050 A1    Aug. 1, 2024

(51) Int. Cl.
*F16H 57/04*    (2010.01)
*C10M 103/02*    (2006.01)
(Continued)

(52) U.S. Cl.
CPC ......... *F16H 57/041* (2013.01); *C10M 103/02* (2013.01); *C10M 103/06* (2013.01);
(Continued)

(58) Field of Classification Search
CPC .............. F16H 49/001; F16H 57/0427; F16H 57/0471; F16H 57/041; F16H 57/0434;
(Continued)

(56) References Cited

U.S. PATENT DOCUMENTS 2,912,065 A * 11/1959 Moller .................... F16N 7/366
184/6.12
3,407,902 A * 10/1968 Musser .................... F16N 11/08
184/6.12
(Continued)

FOREIGN PATENT DOCUMENTS

| JP | H04258555 A | 9/1992 |
| JP | H07205899 A | 8/1995 |

(Continued)

OTHER PUBLICATIONS

International Search Report (PCT/ISA/210) with translation and Written Opinion (PCT/ISA/237) mailed on Sep. 14, 2021 by the Japanese Patent Office as the International Searching Authority for International Application No. PCT/JP2021/027068. (8 pages).

*Primary Examiner* — Henry Y Liu
(74) *Attorney, Agent, or Firm* — Buchanan Ingersoll & Rooney PC (57) ABSTRACT

A lubrication mechanism of a strain wave gearing is disposed in an interior space of an externally toothed gear and comprises a powder-accommodating bag that stores solid lubricant powder. A diaphragm of the externally toothed gear is repeatedly deflected during the driving of the strain wave gearing. Vibration or deflection is repeatedly imparted to the powder-accommodating bag and the solid lubricant powder is discharged from a powder discharge hole formed in the powder-accommodating bag into the interior space. A site to be lubricated is lubricated with the solid lubricant powder discharged into the interior space. Harmful effects due to a large amount of the solid lubricant powder being supplied to the site to be lubricated at one time can be resolved, and a necessary amount of the solid lubricant powder can be continuously supplied to the site to be lubricated.

11 Claims, 6 Drawing Sheets

(51) Int. Cl.
*C10M 103/06* (2006.01)
*C10M 107/38* (2006.01)
*C10N 20/06* (2006.01)
*C10N 50/08* (2006.01)
*F16H 49/00* (2006.01)

(52) U.S. Cl.
CPC ......... *C10M 107/38* (2013.01); *F16H 49/001* (2013.01); *F16H 57/0434* (2013.01); *F16H 57/048* (2013.01); *C10M 2201/0413* (2013.01); *C10M 2201/0613* (2013.01); *C10M 2201/0653* (2013.01); *C10M 2201/0663* (2013.01); *C10M 2213/0623* (2013.01); *C10N 2020/06* (2013.01); *C10N 2050/08* (2013.01)

(58) Field of Classification Search
CPC ............... F16H 57/048; C10M 103/02; C10M 2201/0413; C10M 2201/0613; C10M 2201/0653; C10M 2201/0663; C10M 2213/0623; C10N 2020/06; C10N 2050/08
USPC ........................................................ 184/6.12
See application file for complete search history.

(56) References Cited

U.S. PATENT DOCUMENTS

| | | | | |
|---|---|---|---|---|
| 7,767,631 | B2* | 8/2010 | Levy | C10M 111/04 508/156 |
| 7,905,326 | B2* | 3/2011 | Kiyosawa | F16H 49/001 184/6.12 |
| 8,516,924 | B2* | 8/2013 | Pen | F16H 57/0427 74/640 |
| 9,040,469 | B2* | 5/2015 | Długołęcki | C10M 129/44 508/519 |
| 9,732,836 | B2* | 8/2017 | Su | F16H 57/0471 |
| 9,732,842 | B2* | 8/2017 | Huang | F16H 57/0427 |
| 10,066,181 | B1* | 9/2018 | Swift | C10M 169/044 |
| 10,273,428 | B1* | 4/2019 | Warren | C10M 141/06 |
| 10,655,721 | B2* | 5/2020 | Kobayashi | F16H 57/0471 |
| 10,718,419 | B2* | 7/2020 | Kobayashi | C10M 103/06 |
| 11,614,158 | B2* | 3/2023 | Parrish | F04C 2/102 184/6.12 |
| 2003/0013615 | A1* | 1/2003 | Levy | F16C 33/109 508/113 |
| 2004/0167043 | A1* | 8/2004 | Levy | F16C 33/109 508/471 |
| 2012/0135897 | A1* | 5/2012 | Dlugolecki | C10M 129/40 508/144 |
| 2013/0342060 | A1* | 12/2013 | Sibley | F16C 33/6696 310/90 |
| 2017/0254404 | A1* | 9/2017 | Kobayashi | F16H 49/001 |
| 2017/0370457 | A1* | 12/2017 | Kobayashi | F16H 1/32 |
| 2018/0371350 | A1* | 12/2018 | Pol | C09D 1/00 |
| 2019/0169522 | A1* | 6/2019 | Sawaguchi | C10M 117/02 |

FOREIGN PATENT DOCUMENTS

| | | |
|---|---|---|
| JP | 2000206722 A | 7/2000 |
| WO | 2016084235 A1 | 6/2016 |
| WO | 2016113847 A1 | 7/2016 |

\* cited by examiner

LUBRICATION METHOD FOR GEAR DEVICE

TECHNICAL FIELD

The present invention relates to a gear device such as a strain wave gearing or a planetary gear device. More specifically, the present invention relates to: a lubrication method for a gear device in which sites to be lubricated, such as gear meshing portions or gear bearing portions, are lubricated using a solid lubricant powder; and a gear device provided with a lubrication mechanism that, through the aforementioned lubrication method, lubricates the sites to be lubricated.

BACKGROUND ART

Powder lubrication in which there is produced a powder of a solid lubricant such as molybdenum disulfide ($MoS_2$), tungsten disulfide ($WS_2$), polytetrafluoroethylene (PTFE), graphite, carbon nanotubes, or fullerene is known as a lubrication method for gear devices such as strain wave gearings and planetary gear devices. Powder lubrication has been greatly verified to extend lubrication service life over lubrication methods in which a solid lubricant is merely applied to the surface of sites to be lubricated. In Patent Literature 1 and 2, the applicant of the present application proposes lubrication methods for strain wave gearings in which solid lubricant powders are used.

Patent Literature 3 proposes a gear device (mechanical-element hermetic device for space applications) in which a powder of a solid lubricant such as molybdenum disulfide was used. In the disclosed gear device, the powder of the solid lubricant is sealed in a hermetic casing in which gears or other mechanical elements are accommodated. In a zero-gravity space, the powder of the solid lubricant floats inside the casing and is drawn into sites to be lubricated such as gear meshing portions, the sites to be lubricated being stably lubricated over an extended period. Additionally, inside the casing, a member that agitates the powder of the solid lubricant is attached to a rotating shaft, and the powder of the solid lubricant is agitated and supplied to the sites to be lubricated.

PRIOR-ART LITERATURE

Patent Literature

Patent Literature 1: WO2016/084235
Patent Literature 2: WO2016/113847
Patent Literature 3: JP H07-205899 A

SUMMARY OF THE INVENTION

Problems to be Solved by the Invention

The following problems to be solved exist with prior-art lubrication methods in which a solid lubricant powder is used. The solid lubricant powder is sealed inside a casing of the gear device, and when the gear device is driven, any of the solid lubricant powder that has accumulated at the bottom of the casing is agitated, scattered, and supplied to each site to be lubricated due to generated vibration, rotation of a rotating member such as a gear, or other factors. If a large amount of the solid lubricant powder enters sites to be lubricated in a gear, bearing, or other rotating member in a single action, rotational resistance increases, and in a worst-case scenario rotation is locked. In particular, in cases where the solid lubricant powder is used in lubricating a gear device for space applications, large amounts of the solid lubricant powder may move in a single action due to strong vibration or shock that occurs during launching of a rocket or at other times, clogging up bearings, gear meshing portions, and the like, and proper operation of the gear device may be inhibited.

In order to overcome such harmful effects, it is necessary to allow the solid lubricant powder to be supplied in small amounts to the sites to be lubricated. However, no attention is paid to this matter in the prior art, and no lubrication methods have been proposed for this purpose.

In view of the foregoing, it is an object of the present invention to propose a lubrication method for a gear device that allows a prescribed amount of a solid lubricant powder to be continuously supplied to sites to be lubricated in a gear device. It is a further object of the present invention to provide a gear device comprising a lubrication mechanism for supplying a solid lubricant powder, through the above novel lubrication method, to sites to be lubricated.

Means Used to Solve the Above-Mentioned Problems

In order to solve the aforementioned problems, the lubrication method for a gear device according to the present invention is characterized by:

Accommodating a solid lubricant powder in a powder-accommodating bag provided with powder discharge holes;
  disposing the powder-accommodating bag in a device-interior space where sites to be lubricated are positioned;
  discharging the solid lubricant powder that is accommodated in the powder-accommodating bag into the device-interior space, via the powder discharge holes, by using vibration or force that acts on the powder-accommodating bag or on the solid lubricant powder in association with driving of a gear device; and
  within the device-interior space, lubricating the sites to be lubricated by the solid lubricant powder that has reached the sites to be lubricated.

Additionally, the gear device comprising a lubrication mechanism according to the present invention is characterized by comprising
  a powder-accommodating bag that is disposed in a device-interior space where sites to be lubricated are positioned,
  powder discharge holes that are formed in the powder-accommodating bag, and
  a solid lubricant powder that is accommodated in the powder-accommodating bag,
  the solid lubricant powder being sized so as to be capable of being discharged into the device-interior space through the powder discharge holes.

In the present invention, instead of the solid lubricant powder being sealed in the device-interior space where the sites to be lubricated are positioned, the powder-accommodating bag in which the solid lubricant powder is accommodated is disposed in the device-interior space. The solid lubricant powder inside the powder-accommodating bag will be agitated and scattered due to, inter alia, vibration generated in association with driving of the gear device, and some of the solid lubricant powder will be discharged into the device-interior space through the powder discharge holes. The sites to be lubricated will be lubricated by the solid lubricant powder that has been discharged into the device-interior space.

The size of the powder discharge holes, the density of arrangement thereof, the diameter of the particles of the solid lubricant powder, and other parameters are suitably set on the basis of the anticipated vibration, shock, or other factors, thereby allowing a prescribed amount of the solid lubricant powder to be continuously discharged into the device-interior space in a state in which the gear device is being driven, which in turn allows a requisite amount of the solid lubricant powder to be continuously supplied to the sites to be lubricated. As a result, it is possible to prevent a large amount of the solid lubricant powder from being sent to bearings, gear meshing portions, or the like in a single action. Additionally, the requisite amount of the solid lubricant powder can be continuously supplied to the sites to be lubricated.

A drive member that is disposed in the device-interior space may impart vibration or deformation to the powder-accommodating bag so that the prescribed amount of the solid lubricant powder can be continuously supplied to the device-interior space via the powder discharge holes.

The powder-accommodating bag is made using a non-woven fabric, a filtering material, or another sheet material or film material that has a porous structure, a net structure, or a mesh structure, whereby numerous minuscule holes or apertures that extend through the sheet material or film material function as the powder discharge holes. In applications within a vacuum, it is desirable that the powder-accommodating bag is formed from a sheet material or film material that is composed of PTFE, PEEK, a polyimide, or a polyimideamide.

In a case where the powder-accommodating bag is attached to a prescribed location in the device-interior space, it is desirable to use a bag-securing member that is formed from punched metal or the like and provided with a prescribed degree of rigidity. Specifically, it is desirable to use a bag-securing member that is provided with powder flow-through holes at portions facing the powder discharge holes so as not to inhibit the solid lubricant powder from being discharged to the device-interior space through the powder discharge holes.

In order to efficiently introduce the solid lubricant powder into the sites to be lubricated, the solid lubricant powder having been discharged into the device-interior space through the powder discharge holes in the powder-accommodating bag, it is desirable that a powder-guiding member is disposed in the device-interior space and that the solid lubricant powder that has been discharged into the device-interior space is guided by the powder-guiding member to the sites to be lubricated.

It is possible to use, e.g., $MoS_2$, $WS_2$, PTFE, graphite, carbon nanotubes, fullerene, or boron nitride as the solid lubricant.

The diameter of the particles of the solid lubricant powder is set to, e.g., 10 nm to 100 μm in terms of median diameter. In this case, it is desirable that the powder discharge holes are sized so that particles having a diameter of 5 to 300 times the median diameter can pass therethrough.

The interior of the powder-accommodating bag is partitioned into a plurality of powder-accommodating sections so that the solid lubricant powder will not be unevenly distributed therein, and the powder discharge holes are formed at sites in the bag that correspond to each of the powder-accommodating sections so that the solid lubricant powder will be discharged into the device-interior space from each of the powder-accommodating sections.

Felt can be used as a seal for preventing the solid lubricant powder from leaking out of the device-interior space where powder lubrication is performed.

MODE FOR CARRYING OUT THE INVENTION

Embodiments of a gear device to which the present invention is applied are described below with reference to the accompanying drawings. The embodiments described below pertain to cases in which the present invention is applied to a strain wave gearing, but the present invention can similarly be applied to planetary gear devices or other gear devices as well.

Embodiment 1

Figure 1A:
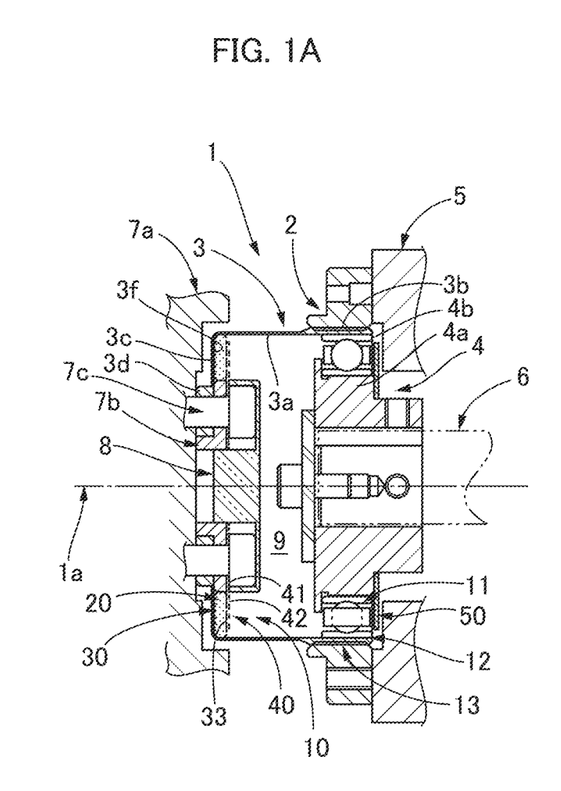
FIG. 1A is a schematic longitudinal cross-sectional view showing a strain wave gearing according to embodiment 1.

FIG. 1A is a schematic longitudinal cross-sectional view showing a cup-shaped strain wave gearing according to embodiment 1. The strain wave gearing 1 comprises an annular rigid internally toothed gear 2, a flexible externally toothed gear 3, and an ellipsoidally contoured wave generator 4. The externally toothed gear 3 is disposed coaxially inside the internally toothed gear 2. The strain wave gearing 1 is installed in a horizontal orientation such that a device center axis 1*a* thereof is oriented in the horizontal direction. For example, the internally toothed gear 2 is secured to a device housing 5 that is a securing-side member, the wave generator 4 is securely linked to an input shaft 6 such as a motor rotating shaft, and the externally toothed gear 3 is securely linked in a coaxial manner to an output shaft 7*a*.

The externally toothed gear 3 is cup-shaped, and external teeth 3*b* are formed on an outer peripheral surface portion on an open-end side of a cylindrical barrel part 3*a* that is capable of flexing in a radial direction. A diaphragm 3c that extends radially inward is formed on the opposite-side end of the cylindrical barrel part 3a. An annular rigid boss 3d is formed on an inner peripheral edge of the diaphragm 3c. The boss 3d is sandwiched between the output shaft 7a and an annular pressing member 7b, in which state the three members are securely fastened in a coaxial manner by a plurality of fastening bolts 7c. The wave generator 4 is provided with a rigid plug 4a and a wave generator bearing 4b that is mounted on the outer peripheral surface of the ellipsoidal contour of the plug 4a. The wave generator 4 is mounted inside a portion of the externally toothed gear 3 where the external teeth 3b are formed on the cylindrical barrel part 3a.

An interior space 9 in the cylindrical barrel part 3a of the externally toothed gear 3 is a part of a device-interior space surrounded by the wave generator 4, which is mounted on the open-end side of the cylindrical barrel part 3a, and a cap 8 that is attached to the boss 3d side. A lubrication mechanism 10 that, using a solid lubricant powder, lubricates sites to be lubricated in the strain wave gearing 1 is incorporated into the interior space 9.

There are three main sites to be lubricated in the strain wave gearing 1. The sites to be lubricated include sections 11 that make contact in the interior of the wave generator 4 (specifically sections of the wave generator bearing 4b where constituent components make contact), sections 12 that make contact between the wave generator 4 and the externally toothed gear 3 (specifically sections where an outer-race outer peripheral surface of the wave generator bearing 4b and the inner peripheral surface of the cylindrical barrel part 3a of the externally toothed gear 3 make contact), and tooth surface sections 13 of the internally toothed gear 2 and the externally toothed gear 3. The aforementioned sites are lubricated by the solid lubricant powder.

The lubrication mechanism 10 is provided with a powder-accommodating bag 30 in which the solid lubricant powder 20 is accommodated, and a bag-securing plate 40. The solid lubricant powder 20 is a powder of a solid lubricant such as $MoS_2$, $WS_2$, PTFE, graphite, carbon nanotubes, fullerene, or boron nitride. As an example, $MoS_2$ powder is used. The diameter of the particles of the solid lubricant powder 20 is adjusted to, e.g., 10 nm to 100 μm in terms of median diameter. The diameter of the particles is a value measured through, e.g., photon diffusion or laser diffraction/scattering.

Figure 1B:
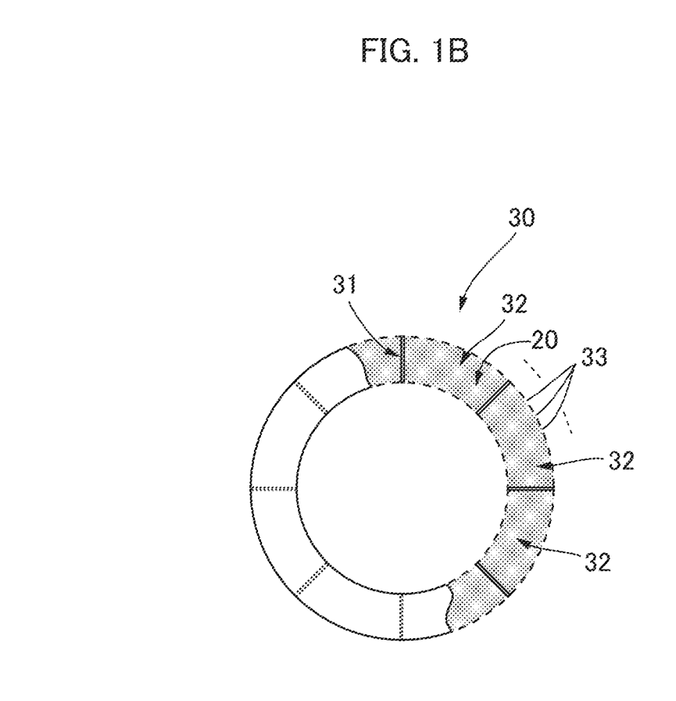
FIG. 1B is an illustrative view showing a powder-accommodating bag.

FIG. 1B is an illustrative view showing the powder-accommodating bag 30 in a state in which a portion thereof is cut away. A description shall now be provided with reference to FIG. 1B. The powder-accommodating bag 30 is an annular bag that is made from a non-woven fabric or another sheet material having a net structure or a mesh structure and exhibiting a certain degree of flexibility, the powder-accommodating bag 30 being sized to correspond to an interior-space 9-side annular inner-side end surface 3f of the diaphragm 3c. In the present example, the interior of the powder-accommodating bag 30 is partitioned by a heat seal 31 or the like at equiangular intervals in a circumferential direction, and a plurality of accommodation sections 32 are formed. A prescribed amount of the solid lubricant powder 20 is accommodated in each of the accommodation sections 32, and the accommodation sections 32 are configured so that the solid lubricant powder 20 will not be unevenly distributed inside the pliable powder-accommodating bag 30.

The powder-accommodating bag 30, which is made from the sheet material having a net structure or a mesh structure, is such that numerous apertures (minuscule holes) via which the interior and exterior of the bag communicate are formed into a lattice. In terms of size, the apertures (minuscule holes) are about 5 to 300 times the diameter of the particles of the accommodated solid lubricant powder 20. The apertures (minuscule holes) function as powder discharge holes 33 through which the accommodated solid lubricant powder 20 can be discharged when vibration or force acts on the powder-accommodating bag 30. In the present example, because the powder-accommodating bag 30 is made using the sheet material having a net structure or mesh structure, the powder discharge holes 33 are formed across the entire bag. The powder discharge holes 33 can also be formed only in a partial region of the powder-accommodating bag 30.

The pliable powder-accommodating bag 30 is disposed between the inner-side end surface 3f of the diaphragm 3c and the bag-securing plate 40, which is secured to the boss 3d. Specifically, the powder-accommodating bag 30 is disposed in a state of following the inner-side end surface 3f and attached to the inner-side end surface 3f by using an adhesive or the like. In this state, the powder-accommodating bag 30 is held between the inner-side end surface 3f and the bag-securing plate 40. An inner-peripheral-edge-side site 41 on the bag-securing plate 40 is secured to the boss 3d, and the bag-securing plate 40 as a whole extends parallel to the inner-side end surface 3f at a given spacing. The powder-accommodating bag 30 is held by the bag-securing plate 40 in a state of being pressed toward the inner-side end surface 3f.

The bag-securing plate 40 is formed from punched metal or another plate material having a rigid mesh structure. Numerous apertures 42 (minuscule holes) that penetrate through the bag-securing plate 40 are formed into a lattice therein. The apertures 42 are approximately equivalent in size to the powder discharge holes 33 or are larger than the powder discharge holes 33. At the site on the powder-accommodating bag 30 that is pressed by the bag-securing plate 40, the solid lubricant powder 20 that has been discharged through the powder discharge holes 33 is discharged into the interior space 9 through the apertures 42.

Figure 1C:
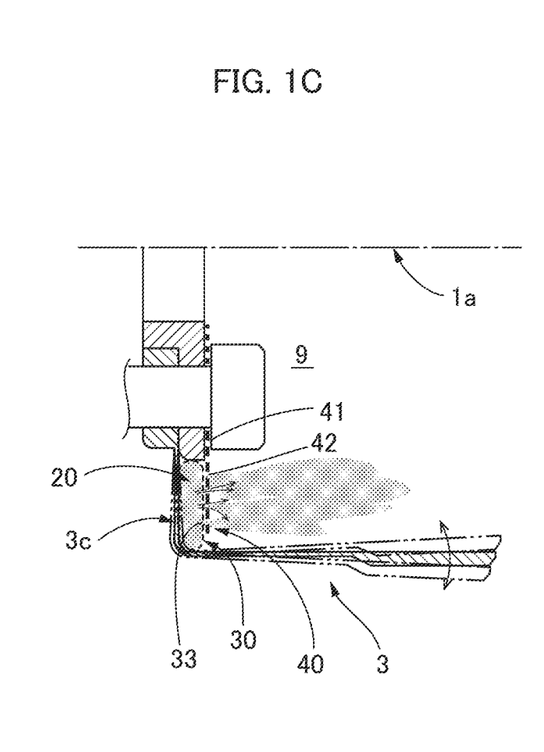
FIG. 1C is an illustrative view showing a situation in which a solid lubricant powder is discharged from the powder-accommodating bag due to flexing of an externally toothed gear.

In a state in which the strain wave gearing 1 comprising the lubrication mechanism 10 is driven, the wave generator 4 rotates, and portions of the cup-shaped externally toothed gear 3 are repeatedly flexed in the radial direction as shown in FIG. 1C. The portion of the diaphragm 3c of the externally toothed gear 3 where the powder-accommodating bag 30 is attached is also repeatedly flexed forward and rearward, with a root portion joined to the boss 3d serving as a starting point. Vibration or deformation is repeatedly imparted to the powder-accommodating bag 30 attached to the diaphragm 3c. The solid lubricant powder 20 that is accommodated in the accommodation sections 32 of the powder-accommodating bag 30 is thereby agitated inside the bag and discharged into the interior space 9 through the powder discharge holes 33.

The solid lubricant powder 20 that has been discharged into the interior space 9 is supplied to the interior contact sections 11 (wave generator bearing 4b) and the contact sections 12 (sections where the wave generator 4 and the externally toothed gear 3 make contact) that face the interior space 9, and the aforementioned portions are lubricated. Furthermore, some of the solid lubricant powder 20 that is supplied to the wave generator bearing 4b moves across a raceway of the wave generator bearing 4b, and some of the solid lubricant powder 20 that is supplied between the wave generator 4 and the externally toothed gear 3 moves across a gap between the aforementioned components. For example, a powder guide 50 that is integrated with the wave generator 4 and that rotates at high speed is disposed to one side of the wave generator bearing 4b. The solid lubricant powder 20 is guided to the outer-peripheral side by the fast-rotating powder guide 50 and supplied to the tooth surface sections 13 of the external teeth and internal teeth, said sections being lubrication sections, and the aforementioned sections are lubricated.

Thus, in the present example, the solid lubricant powder 20 is accommodated in the powder-accommodating bag 30 that is attached to the diaphragm 3c, rather than being sealed in the interior space 9. When vibration or deformation is imparted to the powder-accommodating bag 30 in association with driving of the strain wave gearing 1, the accommodated solid lubricant powder 20 is discharged into the interior space 9 through the powder discharge holes 33. Some of the solid lubricant powder 20 that has been discharged into the interior space 9 reaches the interior contact sections 11 and the contact sections 12, which are sites to be lubricated, and the aforementioned sites are lubricated. The diameter of the particles of the solid lubricant powder 20 and the size of the powder discharge holes 33 in the powder-accommodating bag 30 are suitably set. A prescribed amount of the solid lubricant powder 20 is thereby continuously discharged into the interior space 9 through the powder discharge holes 33 in association with driving of the strain wave gearing 1. Thus, a suitable amount of the solid lubricant powder 20 is continuously supplied to the sites to be lubricated. It is possible to reliably prevent harmful effects such as when a large amount of solid lubricant powder is supplied to the sites to be lubricated in a single action and the sliding resistance of the wave generator bearing 4b increases.

Figure 1D:
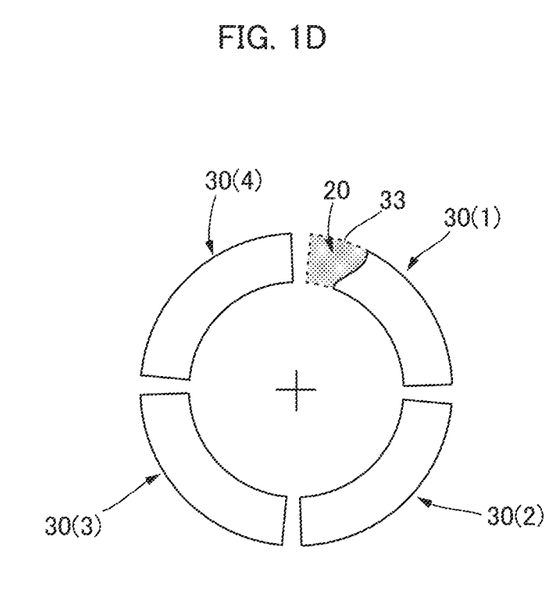
FIG. 1D is an illustrative view showing another example of powder-accommodating bags.

The powder-accommodating bag 30 in the present example is divided into a plurality of portions to form a plurality of accommodation sections 32. It is also possible to use a plurality of powder-accommodating bags instead of the powder accommodating bag 30. FIG. 1D is an illustrative view showing four powder-accommodating bags 30(1)-30 (4) that are arranged in a circular form. The powder-accommodating bags 30(1)-30(4) can be disposed in lieu of the powder-accommodating bag 30. As shall be apparent, the number and arrangement state of powder-accommodating bags are not limited to what is depicted in the example shown in FIG. 1D. Additionally, the sizes and shapes of the powder-accommodating bags may all be the same or may differ in accordance with the arrangement locations. Furthermore, a powder-accommodating bag having a configuration in which the interior is divided into a plurality of portions can be arranged in a plurality.

Modification 1

In the example described above, the powder-accommodating bag 30 is disposed along the inner-side end surface 3f of the diaphragm 3c of the externally toothed gear 3. The powder-accommodating bag 30 can also be disposed at a separate location within the interior space 9 in the externally toothed gear 3.

Figure 2:
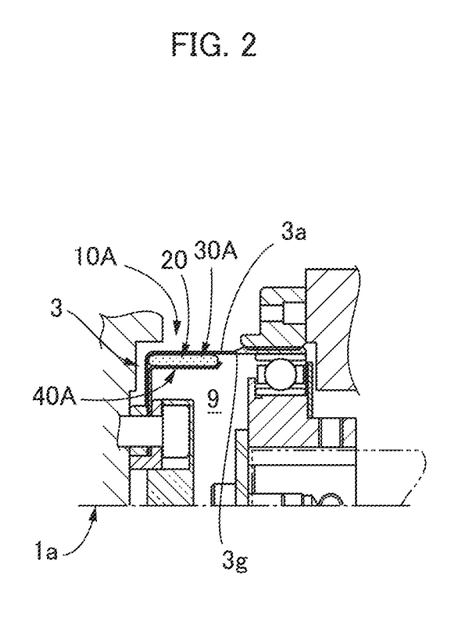
FIG. 2 is an illustrative view showing a modification 1 of the strain wave gearing in which the position of the powder-accommodating bag is changed.

FIG. 2 is an illustrative view showing a modification 1 of the strain wave gearing 1. In a lubrication mechanism 10A according to modification 1, a powder-accommodating bag 30A in which the solid lubricant powder 20 is accommodated is formed in a cylindrical shape and disposed along an inner-peripheral surface portion 3g of the cylindrical barrel part 3a of the externally toothed gear 3. A bag-securing plate 40A for securing the powder-accommodating bag 30A to the externally toothed gear 3 is provided with an attaching annular plate portion that is secured to the boss 3d of the externally toothed gear 3, and a cylindrical plate portion that extends so as to be connected to the outer peripheral edge of the attaching annular plate portion. The cylindrical plate portion presses the powder-accommodating bag 30A toward the inner peripheral surface portion 3g of the cylindrical barrel part 3a. The bag-securing plate 40A is provided with a degree of flexibility that enables flexing in the radial direction following the flexing of the cylindrical barrel part 3a of the externally toothed gear 3 and is formed from punched metal or another plate material having a mesh structure. The powder-accommodating bag 30A is formed from a sheet material having a porous structure, a net structure, or a mesh structure, the sheet material being composed of a pliable non-woven fabric or the like.

As is also the case in the lubrication mechanism 10A having the above configuration, the cylindrical barrel part 3a of the externally toothed gear 3 is repeatedly flexed in the radial direction in association with driving of the strain wave gearing 1, and the portions of the powder-accommodating bag 30A that are held between the cylindrical barrel part 3a and the bag-securing plate 40A are repeatedly displaced in the radial direction following this flexing. Due to this movement, the solid lubricant powder 20 that is accommodated in the powder-accommodating bag 30A is agitated, scattered, and discharged into the interior space 9 via the powder discharge holes and communication holes in the bag-securing plate 40A. The sites to be lubricated are lubricated by the solid lubricant powder 20 that has been discharged into the interior space 9.

Modification 2

Figure 3A:
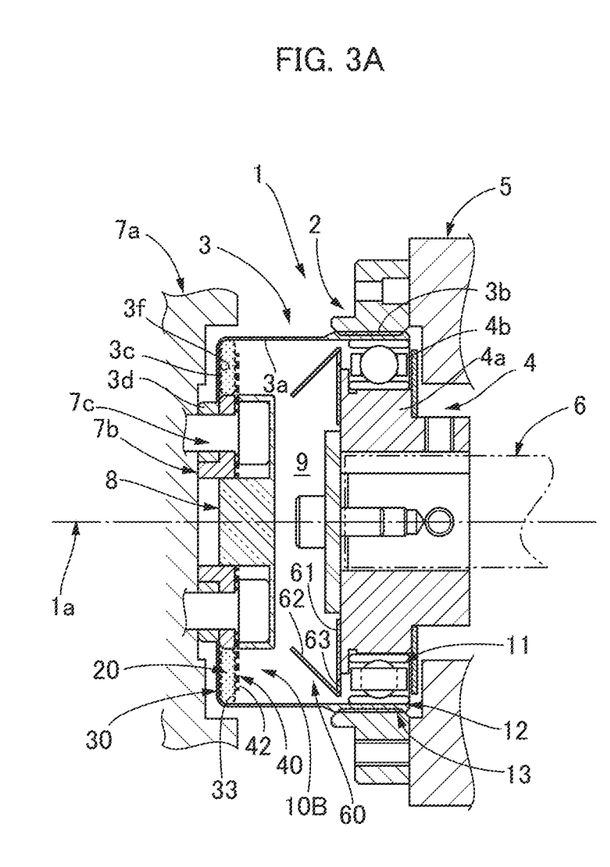
FIG. 3A is a schematic longitudinal cross-sectional view showing a modification 2 of the strain wave gearing in which a powder-agitating/guiding member is disposed.
Figure 3B:
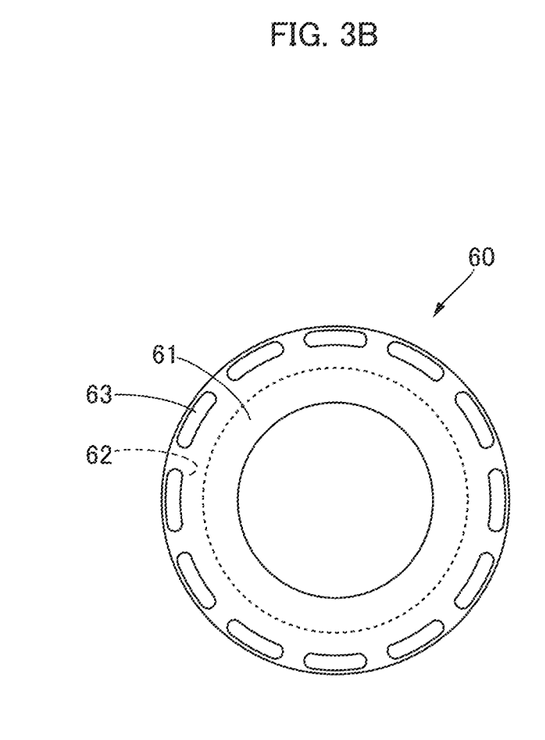
FIG. 3B is an illustrative view showing the powder-agitating/guiding member in modification 2.

FIG. 3A is a schematic longitudinal cross-sectional view showing a modification 2 of the strain wave gearing 1, and FIG. 3B is an illustrative view showing the powder-agitating/guiding member in modification 2. A lubrication mechanism 10B in modification 2 is configured such that a powder-agitating/guiding member 60 is added to the lubrication mechanism 10 shown in FIG. 1A. The powder-agitating/guiding member 60 is coaxially secured to an interior-space 9-side end surface of the plug 4a of the wave generator 4. The powder-agitating/guiding member 60 is provided with an attachment disc portion 61 that is secured to the end surface of the plug 4a, and a conical portion 62 that decreases in diameter from the outer peripheral edge of the attachment disc portion 61 toward the boss 3d of the externally toothed gear 3. Powder flow-through holes 63 are also formed at sites on the outer peripheral edge of the attachment disc portion 61, the powder flow-through holes 63 being formed at equiangular intervals along the circumferential direction.

When the strain wave gearing 1 is driven, the wave generator 4 rotates at high speed, and the powder-agitating/guiding member 60 that is attached to the wave generator 4 rotates together with the wave generator 4 at high speed. The solid lubricant powder 20 that has been discharged into the interior space 9 from the powder-accommodating bag 30 is agitated inside the interior space 9 by the fast-rotating powder-stirring/guiding member 60 and guided toward the sites to be lubricated along the conical portion 62. The solid lubricant powder 20 is also guided to the sites to be lubricated through the powder flow-through holes 63. The solid lubricant powder 20 that has been discharged into the interior space 9 can be efficiently supplied to the sites to be lubricated.

Modification 3

Figure 4A:
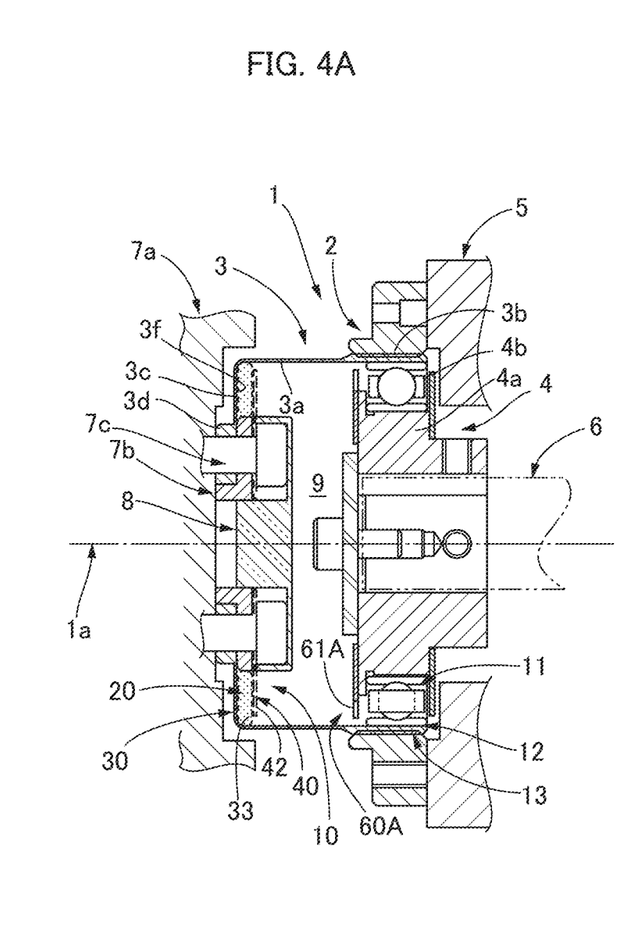
FIG. 4A is a schematic longitudinal cross-sectional view showing a modification 3 in which a powder-agitating/guiding member having a different shape is disposed.
Figure 4B:
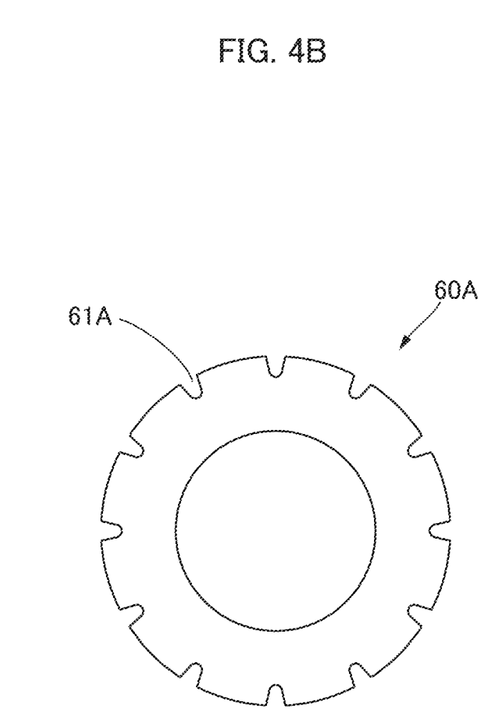
FIG. 4B is an illustrative view showing the powder-agitating/guiding member in modification 3.

It is possible to use a variety of shapes for the powder-agitating/guiding member 60. For example, FIG. 4A is a schematic longitudinal cross-sectional view showing a modification 3 of the strain wave gearing 1, and FIG. 4B is an illustrative view showing the powder-agitating/guiding member in modification 3. As shown in FIGS. 4A and 4B, the powder-agitating/guiding member 60A is an annular plate that is attached to the plug 4a of the wave generator 4, and notched grooves 61A are formed along the outer peripheral edge of the powder-agitating/guiding member 60A, the notched grooves 61A being formed at equiangular intervals in the circumferential direction. Even in a case in which the powder-agitating/guiding member 60A having this shape is used, the solid lubricant powder 20 can be efficiently introduced into the sites to be lubricated.

Embodiment 2

Figure 5:
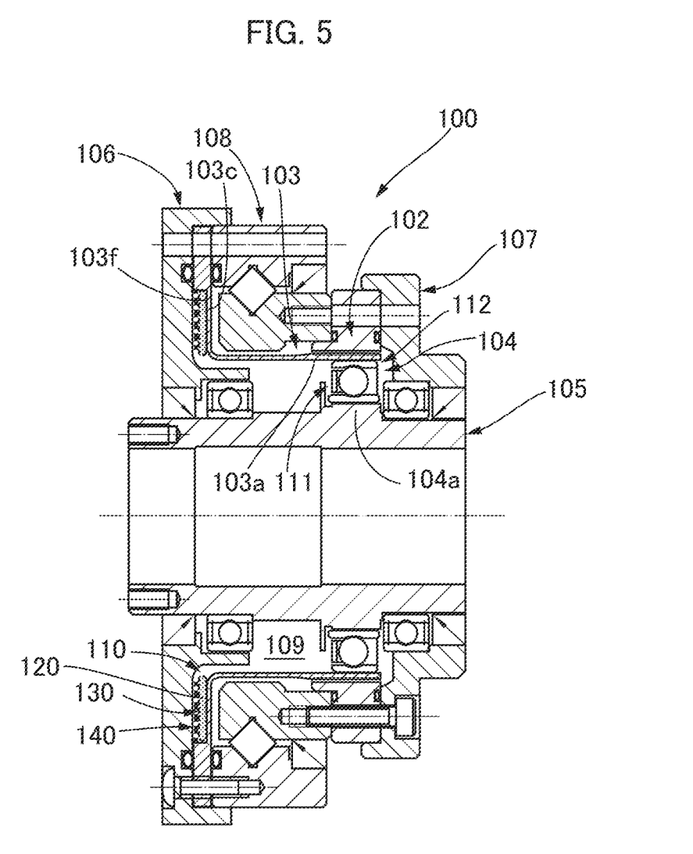
FIG. 5 is a schematic longitudinal cross-sectional view showing a strain wave gearing according to embodiment 2.

FIG. 5 is a schematic longitudinal cross-sectional view showing a strain wave gearing according to embodiment 2 to which the present invention is applied. The strain wave gearing 100 according to embodiment 2 comprises a rigid internally toothed gear 102, a flexible top-hat-shaped externally toothed gear 103, and a wave generator 104 that is disposed inside the externally toothed gear 103. The strain wave gearing 100 also comprises a hollow input shaft 105, end plates 106, 107 that are located on both sides, and a bearing 108 that supports the internally toothed gear 102 and the externally toothed gear 103 in a state that allows relative rotation. A plug 104a of the wave generator 104 is formed integrally with the outer peripheral surface of the hollow input shaft 105. An interior space 109 that is part of a device-interior space is formed between the hollow input shaft 105, the externally toothed gear 103, the wave generator 104, and one of the end plates 106.

A lubrication mechanism 110 is incorporated into the interior space 109. The lubrication mechanism 110 is provided with an annular powder-accommodating bag 130 that is disposed along an annular end surface 103f of a diaphragm 103c of the externally toothed gear 103, and a bag-securing plate 140 for holding the powder-accommodating bag 130 in a state of following the annular end surface 103f. The powder-accommodating bag 130 is configured in the same manner as the powder-accommodating bag 30 in embodiment 1, and the bag-securing plate 140 is configured in the same manner as the bag-securing plate 40 in embodiment 1.

As is also the case in the lubrication mechanism 110 having the above configuration, similarly to the case described in embodiment 1, a solid lubricant powder 120 that is accommodated in the powder-accommodating bag 130 is discharged into the interior space 109 through apertures (powder discharge holes) in the powder-accommodating bag 130 in association with driving of the strain wave gearing 100, the solid lubricant powder 120 is supplied to sections 111 that make contact in the interior of the wave generator 104 (specifically portions of a wave generator bearing where constituent components make contact) and sections 112 that make contact between the wave generator 104 and the externally toothed gear 103 (specifically sections where an outer-race outer peripheral surface of the wave generator bearing and the inner peripheral surface of the cylindrical barrel part 103a of the externally toothed gear 103 make contact), which are sites to be lubricated in the strain wave gearing 100, and the aforementioned sites are lubricated by the solid lubricant powder 120.

Modification of Embodiment 2

Figure 6:
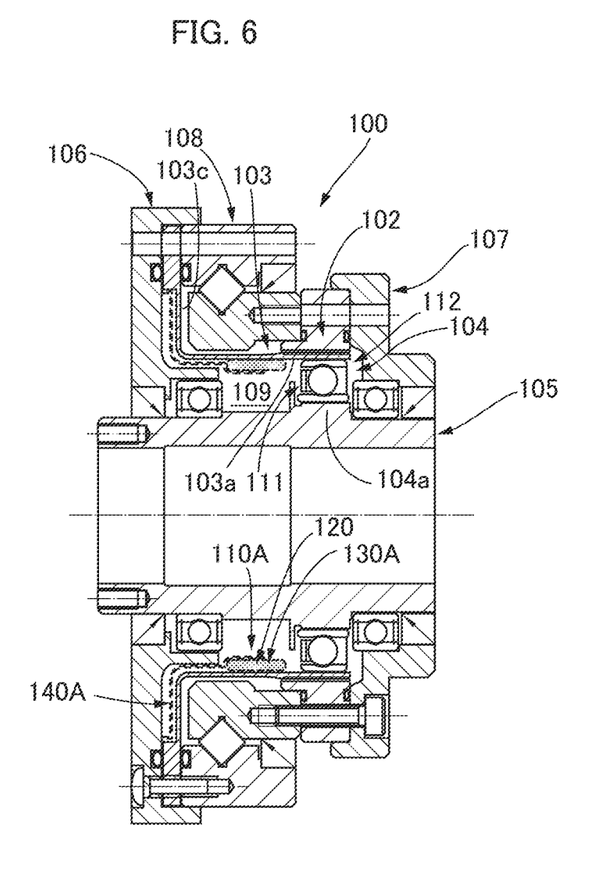
FIG. 6 is a schematic longitudinal cross-sectional view showing a modification of the strain wave gearing in which the position of the powder-accommodating bag is changed.

As is also the case in the top-hat-shaped strain wave gearing 100, the powder-accommodating bag 130 can be disposed at a separate location within the interior space 109. For example, in a lubrication mechanism 110A shown in FIG. 6, a powder-accommodating bag 130A is disposed along the inner peripheral surface of the cylindrical barrel part 103a of the externally toothed gear 103. A state is maintained in which the powder-accommodating bag 130A is held by a bag-securing plate 140A from the radially inner side and disposed along the inner peripheral surface of the cylindrical barrel part 103a. The cylindrical barrel part 103a of the externally toothed gear 103 is repeatedly flexed in the radial direction in association with driving of the strain wave gearing 100, and the portions of the powder-accommodating bag 130A that are held between the cylindrical barrel part 103a and the bag-securing plate 140A are repeatedly displaced in the radial direction following this flexing. Due to this movement, the solid lubricant powder 120 that is accommodated in the powder-accommodating bag 130A is agitated, scattered, and discharged into the interior space 109 via the powder discharge holes (apertures) that are formed in the powder-accommodating bag 130A and powder communication holes (apertures) in the bag-securing plate 140A. Some of the solid lubricant powder 120 that has been discharged into the interior space 109 is supplied to the interior contact sections 111 and the contact sections 112, which are sites to be lubricated, and the aforementioned sites are lubricated.

Other Embodiments

In the examples described above, the externally toothed gear, which is repeatedly flexed, imparts vibration or flexing to the powder-accommodating bag. A drive member for imparting vibration or deformation to the powder-accommodating bag can also be disposed in the device-interior space. For example, in the case of a strain wave gearing, a roller or other member that rotates while pressing the powder-accommodating bag may be attached to the fast-rotating wave generator.

The invention claimed is:

1. A lubrication method for a gear device, the method comprising:
    accommodating a solid lubricant powder in a powder-accommodating bag provided with powder discharge holes;
    disposing the powder-accommodating bag in a device-interior space where sites to be lubricated are positioned;
    attaching a bag-securing member to a constituent component of the gear device, the constituent component being provided with an inner-side surface facing the device-interior space;
    holding the powder-accommodating bag between the inner-side surface and the bag-securing member;
    discharging the solid lubricant powder that is accommodated in the powder-accommodating bag, into the device-interior space, via the powder discharge holes, by using vibration or force that acts on the powder-accommodating bag or on the solid lubricant powder in association with driving of the gear device; and
    lubricating the sites to be lubricated by the solid lubricant powder that has been discharged into the device-interior space and reached the sites to be lubricated.

2. A lubrication method for a gear device, the method comprising:
    accommodating a solid lubricant powder in a powder-accommodating bag provided with powder discharge holes;

disposing the powder-accommodating bag in a device-interior space where sites to be lubricated are positioned;

discharging the solid lubricant powder that is accommodated in the powder-accommodating bag, into the device-interior space, via the powder discharge holes, by using vibration or force that acts on the powder-accommodating bag or on the solid lubricant powder in association with driving of the gear device; and lubricating the sites to be lubricated by the solid lubricant powder that has been discharged into the device-interior space and reached the sites to be lubricated, wherein the interior of the powder-accommodating bag is partitioned into a plurality of accommodation sections so that the solid lubricant powder will not be unevenly distributed therein, and the powder discharge holes are formed at sites corresponding to each of the accommodation sections so that the solid lubricant powder will be discharged into the device-interior space from each of the accommodation sections.

3. A lubrication method for a gear device, the method comprising:

accommodating a solid lubricant powder in a powder-accommodating bag provided with powder discharge holes;

disposing the powder-accommodating bag in a device-interior space where sites to be lubricated are positioned;

discharging the solid lubricant powder that is accommodated in the powder-accommodating bag, into the device-interior space, via the powder discharge holes, by using vibration or force that acts on the powder-accommodating bag or on the solid lubricant powder in association with driving of the gear device; and lubricating the sites to be lubricated by the solid lubricant powder that has been discharged into the device-interior space and reached the sites to be lubricated, wherein:

the gear device is a strain wave gearing provided with a rigid internally toothed gear, a flexible externally toothed gear, and a wave generator;

the wave generator is disposed inside the externally toothed gear, the wave generator causing the externally toothed gear to flex in a radial direction to mesh with the internally toothed gear, and causing the positions at which the externally toothed gear meshes with the internally toothed gear to move in a circumferential direction;

the device-interior space is an inner-side space in the externally toothed gear where the wave generator is disposed, or is a space portion that communicates with the inner-side space; and the powder-accommodating bag is disposed along a site on the externally toothed gear that is repeatedly flexed by the wave generator, the aforementioned site imparting vibration or deformation to the powder-accommodating bag.

4. A gear drive comprising:

a powder-accommodating bag that is disposed in a device-interior space where sites to be lubricated are positioned;

powder discharge holes that are formed in the powder-accommodating bag;

a solid lubricant powder that is accommodated in the powder-accommodating bag; and a bag-securing member that is attached to a constituent component of the gear device, the constituent component being provided with an inner-side surface facing the device-interior space, the powder-accommodating bag being held between the inner-side surface and the bag-securing member, and the solid lubricant powder being sized so as to be capable of being discharged into the device-interior space through the powder discharge holes.

5. A gear drive comprising:

a powder-accommodating bag that is disposed in a device-interior space where sites to be lubricated are positioned;

powder discharge holes that are formed in the powder-accommodating bag;

a solid lubricant powder that is accommodated in the powder-accommodating bag; and a powder-agitating/guiding member that is disposed in the device-interior space, wherein the solid lubricant powder being sized so as to be capable of being discharged into the device-interior space through the powder discharge holes, and the solid lubricant powder discharged into the device-interior space is agitated by the powder-agitating/guiding member and guided by the powder-agitating/guiding member to the sites to be lubricated.

6. A gear drive comprising:

a powder-accommodating bag that is disposed in a device-interior space where sites to be lubricated are positioned;

powder discharge holes that are formed in the powder-accommodating bag;

a solid lubricant powder that is accommodated in the powder-accommodating bag, the solid lubricant powder being sized so as to be capable of being discharged into the device-interior space through the powder discharge holes, wherein the interior of the powder-accommodating bag is partitioned into a plurality of accommodation sections, and the powder discharge holes are formed in each of the accommodation sections so that the solid lubricant powder will be discharged into the device-interior space from each of the accommodation sections.

7. A gear drive comprising:

a powder-accommodating bag that is disposed in a device-interior space where sites to be lubricated are positioned;

powder discharge holes that are formed in the powder-accommodating bag; and a solid lubricant powder that is accommodated in the powder-accommodating bag, the solid lubricant powder being sized so as to be capable of being discharged into the device-interior space through the powder discharge holes, wherein the gear drive further comprises:

a rigid internally toothed gear;

a flexible externally toothed gear; and a wave generator that is disposed inside the externally toothed gear, the wave generator causing the externally toothed gear to flex in a radial direction to mesh with the internally toothed gear, and causing the positions at which the externally toothed gear meshes with the internally toothed gear to move in a circumferential direction, and wherein
the device-interior space is an inner-side space in the externally toothed gear where the wave generator is disposed, or is a space portion that communicates with the inner-side space, and
the powder-accommodating bag is disposed along a site on the externally toothed gear that is repeatedly flexed by the wave generator, the aforementioned site imparting vibration or deformation to the powder-accommodating bag.

8. The gear device according to claim 7,
wherein
the powder-accommodating bag is made from a sheet material or film material that has a porous structure, a net structure, or a mesh structure; and
apertures that extend through the sheet material or film material function as the powder discharge holes.

9. The gear device according to claim 8,
wherein
the powder-accommodating bag is formed from PTFE, PEEK, a polyimide, or a polyimideamide.

10. The gear device according to claim 7,
wherein
the solid lubricant powder is a powder of $MoS_2$, $WS_2$, PTFE, graphite, carbon nanotubes, fullerene, or boron nitride.

11. The gear device according to claim 7,
wherein
the diameter of the particles of the solid lubricant powder is 10 nm to 100 μm in terms of median diameter, and
the powder discharge holes are sized so that particles having a diameter of 5 times to 300 times the median diameter can pass therethrough.

* * * * *